United States Patent
Chen et al.

(10) Patent No.: US 11,586,425 B2
(45) Date of Patent: Feb. 21, 2023

(54) METHOD FOR COMPILATION OPTIMIZATION OF HOSTED APP, ELECTRONIC DEVICE AND READABLE STORAGE MEDIUM

(71) Applicant: BAIDU ONLINE NETWORK TECHNOLOGY (BEIJING) CO., LTD., Beijing (CN)

(72) Inventors: Du Chen, Beijing (CN); Yuekeng Liu, Beijing (CN); Fang Zhan, Beijing (CN); Hongtao Zhang, Beijing (CN); Yuzhen Chen, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/348,334

(22) Filed: Jun. 15, 2021

(65) Prior Publication Data
US 2022/0035610 A1 Feb. 3, 2022

(30) Foreign Application Priority Data
Jul. 30, 2020 (CN) .......................... 202010752207.X

(51) Int. Cl.
*G06F 8/41* (2018.01)
*G06F 8/71* (2018.01)

(52) U.S. Cl.
CPC .............. *G06F 8/4441* (2013.01); *G06F 8/71* (2013.01)

(58) Field of Classification Search
CPC ................................ G06F 8/4441; G06F 8/71
See application file for complete search history.

(56) References Cited

U.S. PATENT DOCUMENTS

| 7,694,291 | B2* | 4/2010 | Chen .................. G06F 8/71 717/169 |
| 9,134,980 | B1* | 9/2015 | Cabrera ................. G06F 8/41 |
| 9,645,814 | B1 | 5/2017 | Roque et al. |
| 10,552,130 | B1* | 2/2020 | Tene .................... G06F 8/443 |
| 10,846,196 | B1 | 11/2020 | Tene et al. |

(Continued)

FOREIGN PATENT DOCUMENTS

JP 2012521728 A 9/2012

OTHER PUBLICATIONS

Extended European Search Report of European application No. 21179699.0 dated Nov. 23, 2021, 7 pages.

*Primary Examiner* — Douglas M Slachta
(74) *Attorney, Agent, or Firm* — Brooks Kushman P.C.

(57) ABSTRACT

The technical solutions relate to the technical field of compilation of applications, and particularly to the technical field of mini programs. A developer tool constructs a first compilation result of the hosted APP before compilation optimization and a second compilation result of the hosted APP after the compilation optimization respectively based on a source code of the hosted APP, and uploads them to a management platform. The management platform sends the corresponding compilation results according to environment data of the hosted APP running environment provided by the host APP, so that the host APP uses the hosted APP running environment provided by the host APP to run the obtained compilation result.

16 Claims, 4 Drawing Sheets

(56) References Cited

U.S. PATENT DOCUMENTS

| | | | |
|---|---|---|---|
| 2003/0018960 A1* | 1/2003 | Hacking | G06F 11/3612 714/E11.195 |
| 2003/0182652 A1* | 9/2003 | Custodio | G06F 8/62 717/122 |
| 2005/0071831 A1* | 3/2005 | Sheikh | G06F 8/443 717/151 |
| 2008/0127151 A1* | 5/2008 | Kawahito | G06F 8/443 717/159 |
| 2011/0239200 A1* | 9/2011 | Binsztok | G06F 8/311 717/140 |
| 2011/0246974 A1* | 10/2011 | Kawachiya | G06F 8/4441 717/148 |
| 2014/0047423 A1* | 2/2014 | Pizlo | G06F 8/443 717/153 |
| 2016/0196204 A1* | 7/2016 | Allen | G06F 11/3672 717/125 |
| 2017/0269907 A1* | 9/2017 | Goetz | G06F 8/30 |
| 2020/0117433 A1* | 4/2020 | Tene | G06F 8/75 |
| 2020/0387363 A1* | 12/2020 | Waltenberg | G06F 8/53 |
| 2021/0034501 A1 | 2/2021 | Tene et al. | |
| 2021/0141632 A1* | 5/2021 | Felisatti | G06F 9/445 |

* cited by examiner

# METHOD FOR COMPILATION OPTIMIZATION OF HOSTED APP, ELECTRONIC DEVICE AND READABLE STORAGE MEDIUM

CROSS-REFERENCE TO RELATED APPLICATIONS

The present disclosure claims the priority and benefit of Chinese Patent Application No. 202010752207.X, filed on Jul. 30, 2020, entitled "METHOD AND APPARATUS FOR COMPILATION OPTIMIZATION OF HOSTED APP, ELECTRONIC DEVICE AND READABLE STORAGE MEDIUM." The disclosure of the above application is incorporated herein by reference in its entirety.

TECHNICAL FIELD

The present disclosure relates to the technical field of computers, particularly to the technical field of compilation of applications, more particularly to the technical field of mini programs, and more particularly to a method for compilation optimization of a hosted APP, an electronic device and a readable storage medium.

BACKGROUND

With in-depth development of the Internet, applications (APPs) applied on terminals are booming. Some applications may be referred to as host APPs which can provide specific services of some other applications through specific forms of applications running therein. These specific forms of applications needn't be installed on a terminal and may be referred to as hosted APPs, for example, various mini programs such as Baidu Know-how Mini program, Baidu Library Mini program etc. in Baidu APP that provide specific services. Usually, a developer needs to use a developer tool to compile the source code of a hosted APP, and the developer tool packages and uploads a compilation result obtained by the compilation, for use by a user in search.

However, since the hosted APP running in the host APP completely depends on the host APP, the host APP of a current version used by partial users might fail to obtain and run the compilation result of the optimized hosted APP. Hence, it is difficult to optimize the compilation processing of the hosted APP, thereby causing the reduction of the running efficiency and reliability of the hosted APP.

SUMMARY

Embodiments of the present disclosure provide a method for compilation optimization of a hosted APP, an electronic device and a readable storage medium, to improve the efficiency and reliability in running the hosted APP.

According to an embodiment, there is provided a method for compilation optimization of a hosted APP, which includes: obtaining environment data of a hosted APP running environment provided by a host APP, in response to receiving from the host APP a request to obtain the hosted APP; querying in compilation results of the hosted APP uploaded by a developer tool, according to the environment data of the hosted APP running environment provided by the host APP, to obtain a compilation result runnable by the host APP, where the compilation results of the hosted APP include a first compilation result before compilation optimization and a second compilation result after the compilation optimization; sending to the host APP the compilation result runnable by the host APP obtained, so that the host APP runs the compilation result by using the hosted APP running environment provided by the host APP.

According to an embodiment, there is provided another method for compilation optimization of a hosted APP, which includes: obtaining source code of a hosted APP; constructing compilation results of the hosted APP according to the source code of the hosted APP, wherein the compilation results of the hosted APP include a first compilation result before compilation optimization and a second compilation result after the compilation optimization; and uploading the compilation results of the hosted APP to a management platform.

According to an embodiment, there is provided an electronic device, including: at least one processor; and a memory communicatively connected with the at least one processor; where, the memory stores instructions executable by the at least one processor, and the instructions are executed by the at least one processor to cause the at least one processor to carry out the method described above.

According to an embodiment, there is provided a non-transitory computer-readable storage medium storing instructions, which, when executed by a computer, cause the computer to carry out the method described above.

BRIEF DESCRIPTION OF THE DRAWINGS

To describe technical solutions of embodiments of the present disclosure more clearly, figures to be used in the embodiments or in depictions regarding the prior art will be described briefly. Obviously, the figures described below are some embodiments of the present disclosure. Those having ordinary skill in the art appreciate that other figures may be obtained from these figures without making inventive efforts. The figures are only intended to facilitate understanding the solutions, not to limit the present disclosure. In the figures.

DETAILED DESCRIPTION

Figure 1:
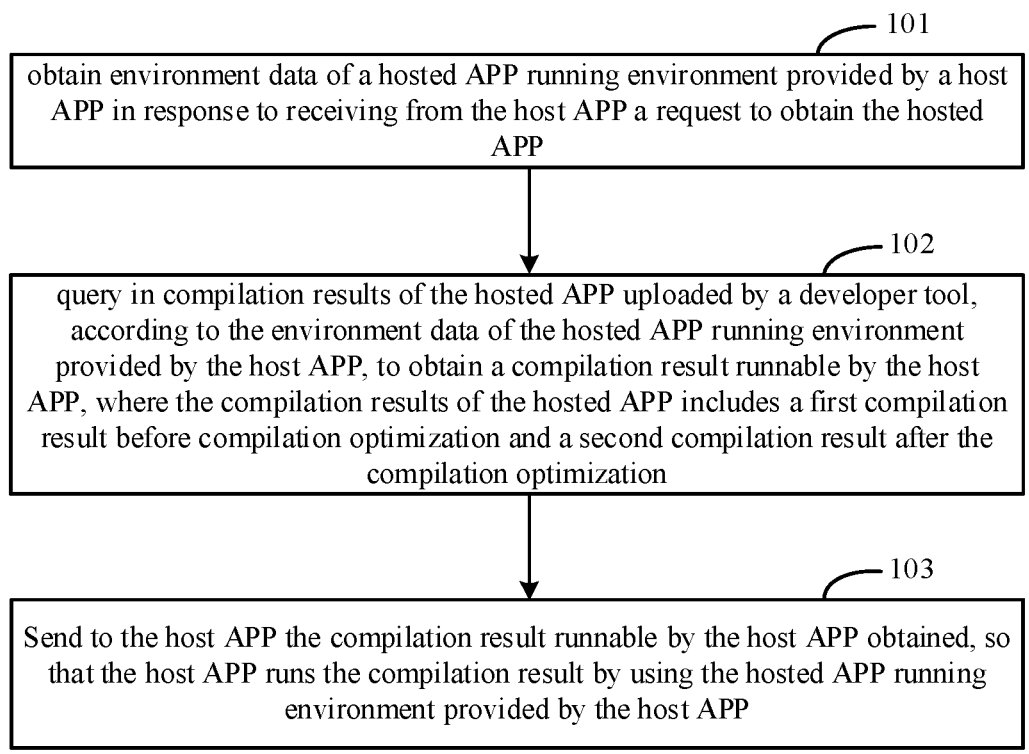
FIG. 1 illustrates a schematic diagram of a first embodiment of the present disclosure.

Exemplary embodiments of the present disclosure are described below with reference to the accompanying drawings, include various details of the embodiments of the present disclosure to facilitate understanding, and should be considered as being only exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

Obviously, the described embodiments are partial embodiments of the present disclosure, not all embodiments.

Based on embodiments in the present disclosure, all other embodiments obtained by those having ordinary skill in the art without making inventive efforts all fall within the protection scope of the present disclosure.

It is to be noted that a terminal device involved in the embodiments of the present disclosure may include but not limited to a smart device such as a mobile phone, a Personal Digital Assistant (PDA), a wireless handheld device and a tablet computer; a display device may include but not limited to a device having a displaying function such as a Personal Computer or a TV set.

In addition, the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

The hosted APP involved in the present disclosure, for example, is an application such as a mini program which needn't be installed on the terminal, and is a runtime ecology that is physically isolated by a rendering layer and a logic layer and may work purely offline. The hosted APP is to run on a hosted APP running platform for example, a mini program runtime Software Development Kit (SDK), integrated in the host APP, and a hosted APP framework is uploaded to the hosted APP running platform. According to standard JP-extended Domain Specific Language (DSL) grammar, the hosted APP is to be compiled and packaged through the developer tool, and then uploaded to a management platform for use by the user in search.

Take a mini program as an example. When a mini program developer develops the mini program through the developer tool, source code of the mini program is compiled and packaged through the developer tool, and then uploaded to the management platform of the mini program. When the mini program runtime SDK runs the mini program, the products constructed by the developer tool will be uploaded in a certain order.

Quick opening of the mini program is a grand prospect guiding us to improve extreme experience of the mini program-side users, and needs to be optimized from a full flow of developing the mini program. The conventional optimization performed in the mini program production stage involves different compilation products of the mini programs, so it involves dependency on the version of the developer tool used by the developer, the lowest version of a mini program framework such as a Baidu Smart Mini program Core Framework (swanjs) and the version of the host APP. Hence, under a conventional mechanism, the solution of optimization performed in the production stage of the mini program cannot quickly get online for experiments.

To sum up, after the compilation products constructed by the developer tool change, dependency on all stages on the full-flow link of the production stage of mini programs will be involved:

1. Dependency on the developer tool currently used by the developer (whether the latest version is used);

2. Dependency on the lowest version of a mini program frame such as swanjs expressed by the developer tool on the mini program management platform;

3. Dependency on the version of the host APP and the version of the currently-run mini program framework such as swanjs.

If the latest version of the compilation product of the developer tool needs to be run, the above dependencies need to be satisfied simultaneously. Especially for the dependency 2, the developer needs to actively give up distributing the mini program at a low-version host APP, which will cause partial loss to the number of the developer's Daily Active Users (DAUs), so that it is extremely difficult to simultaneously satisfy the above conditions under the conventional mechanism. Hence, the developer tool cannot get online if it involves changes of the compilation products.

Therefore, there are the following two technical problems under the conventional solution:

1. The latest version of the developer tool should always maintain the compatibility logic for historical version code, and the compilation products constructed by it always needs to run on all versions of the hosted APP running environment provided by the host APP.

2. The above dependency conditions cannot be satisfied simultaneously, thereby causing the function and optimization of the developer tool involving the changes of the compilation product to fail to get online timely.

The present disclosure provides a method for compilation optimization of a hosted APP, which can make the compilation products of the hosted APP get online quickly at different time, and can support distribution of the optimal constructed product version according to the host APP and swanjs version currently used by the user, thereby solving the dilemma that the optimization means or functions cannot be put into operation after the compiled and constructed products in the production stage of the hosted APP change.

FIG. 1 illustrates a schematic diagram of a first embodiment of the present disclosure.

101: obtaining environment data of a hosted APP running environment provided by a host APP, in response to receiving from the host APP a request to obtain the hosted APP;

102: querying in compilation results of the hosted APP uploaded by a developer tool, according to the environment data of the hosted APP running environment provided by the host APP, to obtain a compilation result runnable by the host APP, herein the compilation results of the hosted APP include a first compilation result before compilation optimization and a second compilation result after the compilation optimization.

103: sending to the host APP the compilation result runnable by the host APP obtained, so that the host APP runs the compilation result by using the hosted APP running environment provided by the host APP.

It is to be noted that subjects for executing 101-103 may partially or totally be a processing engine located in a network-side server, or a distributed system located on the network side, e.g., a processing engine or distributed system in a management platform on the network side. This is not particularly limited in this embodiment.

It may be understood that the host APP may be a native application (nativeAPP) installed on the local terminal, or a web program (webAPP) of a browser on the local terminal. This is not particularly limited in this embodiment.

In the present disclosure, the first compilation result of the hosted APP and the second compilation result of the hosted APP are both constructed by the developer tool according to the same source code of the hosted APP, and they are different from each other in that the first compilation result may be an original compilation result before compilation optimization of the developer tool; the second compilation result may be an optimized compilation result after compilation optimization of the developer tool.

Specifically, the first compilation result may be an original compilation result before the compilation optimization of the developer tool, and it may run on all versions above the lowest version of a hosted APP framework set by the developer; the second compilation result may be one or more optimized compilation results after the compilation optimization of the developer tool, for example, the latest compilation result after the latest compilation optimization, and intermediate compilation results after historical compilation optimization of the developer tool one time or more times. The second compilation result may run on versions above the lowest version of the hosted APP framework recorded by the developer tool.

The so-called original compilation result may refer to an initial version without a change of a constructed product involved by an original function without any optimization on the developer tool, for example, an S1 version without any optimization being activated; the so-called latest compilation result may refer to a changed version with changes of the constructed product involved by a function having undergone all optimizations on the developer tool, e.g., a S5 version for which 10 items of optimizations have been activated; the so-called intermediate compilation result may refer to a changed version with one or more changes of the constructed product involved by a function having undergone partial optimizations on the developer tool, e.g., a S2 version for which 3 items of optimizations have been activated, a S3 version for which 5 items of optimizations have been activated, and a S4 version for which 8 items of optimizations have been activated.

As such, the first compilation result of the hosted APP before the compilation optimization, and a plurality of second compilation results after the compilation optimization being performed multiple times are constructed respectively based on the source code of the hosted APP through the developer tool, so that the developer tool not only can provide an optimized compilation result of a single version, but also further provide optimized compilation results of multiple versions, thereby improving the reliability in running the constructed product online after a change.

To simplify the operation, the second compilation result, for example, is the latest compilation result after the latest compilation optimization of the developer tool. In this case, the developer tool may no longer internally maintain the intermediate result after the optimization of the constructed product, i.e., the intermediate compilation result, thereby making the later distribution design simpler on the one hand, and making the processing of the developer tool and management tool simpler on the other hand.

In the present disclosure, the environment data of the hosted APP running environment provided by the host APP includes at least one of: version data of the host APP, e.g., a version number of a Baidu APP; or version data of the hosted APP running environment provided by the host APP.

The version data of the hosted APP running environment provided by the host APP may be the version data of a hosted APP running platform integrated by the host APP, e.g., a version number of a mini program runtime Software Development Kit (SDK), or may be version data of a hosted APP framework loaded on the hosted APP running platform integrated by the host APP, e.g., a version number of a Baidu Smart Mini program Core Framework (swanjs). This is not particularly limited in this embodiment.

Usually, the version data of the host APP may be correspond one to one with the version data of the hosted APP running environment provided by the host APP. Therefore, if one of them is determined, the other may be determined.

Similarly, the version data of the hosted APP running platform integrated by the host APP may correspond one to one with the version data of the hosted APP framework loaded on the hosted APP running platform integrated by the host APP. Therefore, if one of them is determined, the other may be determined.

The so-called hosted APP running platform may be used to provide a running environment for the hosted APP in the host APP, and is a requisite condition by which the hosted APP can be activated and run in the host APP. The hosted APP running platform may provide the hosted APP with a template of an interface to be displayed, a browser and personalized service for different host APPs or different operation systems.

Optionally, in a possible implementation of the present application, at 102, the queried compilation results of the hosted APP are constructed and uploaded by the developer tool.

Specifically, the developer tool may specifically obtain the source code of the hosted APP, and thereby may, according to the source code of the hosted APP, construct the compilation results of the hosted APP, i.e., the first compilation result and the second compilation result, and upload the constructed compilation results of the hosted APP to the management platform.

In a specific implementation process, the developer tool needs to upload the compilation results of the hosted APP in an agreed specified order, e.g., upload the first compilation result first, and then upload the second compilation result.

Correspondingly, after the compilation results of the hosted APP uploaded by the developer tool in the agreed specified order are received, it is possible to, according to the uploading order of the developer tool, marking the hosted APP running environment on which the compilation results depend, namely, marking environment data such as the lowest version of the hosted APP running environment on which the compilation results depend, and the lowest version of the hosted APP framework uploaded on the hosted APP running platform on which the compilation results depend, to ensure the version data of the hosted APP running environment on which the second compilation result depends is greater than the version data of the hosted APP running environment on which the first compilation result depends, and the version data of the hosted APP running environment on which the second compilation result depends increments in an ascending order according to the number of optimized functions.

For example, the developer tool first uploads the first compilation result. After the first compilation result is received, the lowest version of the hosted APP running environment on which the first compilation result depends is recorded as the lowest version S1 of the hosted APP running environment set by the developer, and mark the first compilation result as V. Then, the developer tool uploads the second compilation result. If there are a plurality of compilation results, the compilation results may be uploaded sequentially in an ascending order according to the number of the optimized functions. After the second compilation result is received, take one second compilation result as an example, the lowest version of the hosted APP running environment on which the second compilation result depends is recorded as the lowest version of the hosted APP running environment recorded by the developer tool, for example, mark the lowest version of the Baidu Smart Mini program Core Framework (swanjs) as S2 (S1⇐S2), and mark the second compilation result as V1 (V<V1).

In another specific implementation process, after the compilation result of the hosted APP is constructed, the developer tool may specifically generate the respective version data of the compilation results according to the compilation results of the hosted APP. The respective version data of the compilation results may include but not limited the version data of the first compilation result, the lowest version data of the hosted APP running environment on which the first compilation result depends, the version data of the second compilation result, and the lowest version data of the hosted APP running environment on which the second compilation result depends. Then, the developer tool may upload the compilation results and the respective version data of the compilation results to the management platform.

The lowest version data of the hosted APP running environment on which the compilation results (namely, the first compilation result and second compilation result) of the hosted APP depend may be the version data of the hosted APP running platform on which they depend, for example, a version number of a mini program runtime SDK, or may be the lowest version data of the hosted APP framework loaded on the hosted APP running platform on which they depend, e.g., a version number of a Baidu Smart Mini program Core Framework (swanjs). This is not particularly limited in this embodiment.

In the implementation process, the order in which the developer tool uploads the compilation results of the hosted APP may be a random order, and may not necessarily be the agreed specified order. The version data of the compilation results generated by the developer tool may be used to indicate a version mark of the hosted APP compiled this time, for example, the developer tool may specifically sequentially generate the version data of the compilation results according to a current-time compilation version generating rule of the hosted APP, or may be used to indicate version marks of the hosted APP after all complication processing, for example, the developer tool may specifically sequentially generate the version data of the compilation results according to a uniform compilation version generating rule of the hosted APP.

Correspondingly, after the compilation results of the hosted APP uploaded by the developer tool and the version data of the compilation results are received, it is possible to, according to the version data of the compilation results, marking the hosted APP running environment on which the compilation results depend, namely, marking the lowest version of the hosted APP running environment on which the compilation results depend, e.g., environment data such as the lowest version of the hosted APP framework uploaded on the hosted APP running platform on which the compilation results depend.

Optionally, in a possible implementation of this embodiment, before 102, it is further possible to obtain the compilation results of the hosted APP uploaded by the developer tool, then examining the compilation results of the hosted APP, and then marking a runnable environment for a compilation result whose examination result is "pass", according to the examination results of the compilation results.

To enable the host APP that can only provide the lowest version of hosted APP running environment to obtain the compilation results of the hosted APP, the examination result of the first compilation result may be used to perform association adjustment for the examination result of the second compilation result obtained according to a configuration and examination policy, thereby effectively improving the efficiency and reliability in running the hosted APP after the optimization.

Specifically, the examination may be performed for the first compilation result and second compilation result, respectively according to a conventional configuration and examination policy.

For example, a corresponding host version two-dimensional code is generated according to the lowest version data of the hosted APP running environment on which the compilation results (namely, the first compilation result and the second compilation result) of the hosted APP, and then the host APP used by an examiner runs the compilation results according to the host version two-dimensional code so that the examiner examines the compilation results, e.g., whether the running function of the compilation results is normal, and whether there exist some behaviors against the design specification of the hosted APP.

After the first compilation result and the second compilation result are examined respectively to obtain the examination result of the first compilation result and the examination result of the second compilation result respectively, if the examination result of the first compilation result is "pass", adjustment may not be made for the examination result of the second compilation result; if the examination result of the first compilation result is "fail to pass", the examination result of the second compilation result may be further adjusted as "failing to pass".

After the respective examination results of the compilation results are obtained, the marking processing for the runnable environment may be performed for the compilation result that has passed the examination processing, according to the examination results of the compilation results and the lowest version of the hosted APP running environment on which the marked compilation results depend.

For example, a distribution section of the first compilation result of the hosted APP is marked as [S1, positive infinite), i.e., the version number of the hosted APP running environment that the host APP may provide may be issued within a range of [S1, positive infinite), e.g., the version number of Baidu Smart Mini program Core Framework (swanjs) running in the host APP may be issued within the range of [S1, positive infinite).

Alternatively, as another example, the distribution section of the second compilation result of the hosted APP is marked as [S2, positive infinite), S1⇐S2, i.e., the version number of the hosted APP running environment that the host APP may provide may be issued within a range of [S2, positive infinite), e.g., the version number of Baidu Smart Mini program Core Framework (swanjs) running in the host APP may be issued within the range of [S2, positive infinite).

Optionally, in a possible implementation of this embodiment, at 102, it is specifically possible to perform first-time judgment for the environment data of the hosted APP running environment provided by the host APP, to judge whether the environment data of the hosted APP running environment provided by the host APP is within the distribution section of the second compilation result of the hosted APP.

If the environment data of the hosted APP running environment provided by the host APP is within the distribution section of the second compilation result of the hosted APP, the second compilation result of the hosted APP may be taken as a query result, namely, a compilation result runnable by the host APP.

If the environment data of the hosted APP running environment provided by the host APP is not within the distribution section of the second compilation result of the hosted APP, second-time judgment processing may be performed for the environment data of the hosted APP running environment provided by the host APP, to judge whether the environment data of the hosted APP running environment provided by the host APP is within the distribution section of the first compilation result of the hosted APP.

If the environment data of the hosted APP running environment provided by the host APP is within the distribution section of the first compilation result of the hosted APP, the first compilation result of the hosted APP may be taken as a query result, namely, a compilation result runnable by the host APP.

If the environment data of the hosted APP running environment provided by the host APP is not within the distribution section of the first compilation result of the hosted APP, a prompt process may be performed for the host APP to update the host APP.

So far, a runnable compilation result matched with the host APP is obtained. The obtained host APP-runnable compilation result is sent to the host APP, so that the host APP uses the hosted APP running environment provided by the host APP to run the compilation result.

After the technical solution of the present disclosure is applied, part of currently-determined optimization means get online through experiments to gain benefit. With the mechanism being made through, subsequent optimization means all may be put into operation through the passageway.

According to the technical solution of the present disclosure, mainly by solving the dependency 2 in the conventional production stage of the hosted APP, the developer tool, according to the hosted APP running environment provided by the host APP that might be currently used by a majority of users, constructs different constructed product versions for the source code of the developer's one hosted APP, namely, the original compilation result before the compilation optimization of the developer tool, and the optimized compilation result after the compilation optimization of the developer tool, thereby uploading the constructed product versions to the management platform of the hosted APP so that the management platform of the hosted APP purposefully sends the corresponding constructed product version according to the hosted APP running environment provided by the host APP used by the user. Since the dependency 1 and dependency 3 converge rapidly, for example, they both can converge to a 80%+ level within one week after the release of the new version, it can be ensured that the optimization means in the production stage of the hosted APP can get online within a short period of time, and cover many user traffic versions on the line after the technical solution of the present disclosure is applied.

In this embodiment, the developer tool constructs the first compilation result of the hosted APP before the compilation optimization and the second compilation result of the hosted APP after the compilation optimization respectively based on the source code of the hosted APP, and uploads them to a management platform. The management platform issues the corresponding compilation results according to the environment data of the hosted APP running environment provided by the host APP, so that the host APP uses the hosted APP running environment provided by the host APP to run the obtained compilation results. Since the optimization of the compilation processing of the hosted APP is no longer limited to the version of the host APP used by the user, the compilation optimization of the hosted APP is performed smoothly, thereby effectively improving the running efficiency and reliability of the hosted APP after the optimization.

In addition, according to the technical solution provided by the present disclosure, the developer tool not only constructs the second compilation result of the hosted APP after the compilation optimization, but also constructs the first compilation result of the hosted APP before the compilation optimization, so that the developer tool can get rid of the burden in keeping compatible with historical versions of the host APP during the compilation optimization such that the internal code of the developer tool is clearer, and its compilation products are more efficient, thereby improving the compilation efficiency of the developer tool.

In addition, the technical solution provided by the present disclosure can be employed to effectively open a new path for putting changes of the compilation products online quickly to gain large benefits.

In addition, the technical solution provided by the present disclosure can be employed to improve the user's experience.

Figure 2:
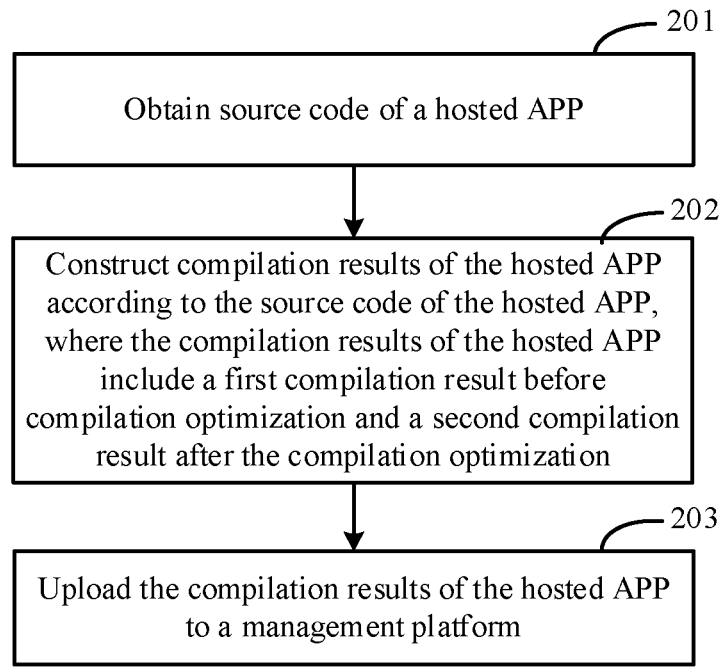
FIG. 2 illustrates a schematic diagram of a second embodiment of the present disclosure.

FIG. 2 illustrates a schematic diagram of a second embodiment of the present disclosure.

201: obtaining source code of a hosted APP.

202: constructing compilation results of the hosted APP according to the source code of the hosted APP, herein the compilation results of the hosted APP includes a first compilation result before compilation optimization and a second compilation result after the compilation optimization.

203: uploading the compilation results of the hosted APP to a management platform.

It is to be noted that subjects for executing 201-203 may partially or totally be an application located at a local terminal, or be a function unit such as a plug-in or a Software Development Kit (SDK) in the application located at the local terminal, or a processing engine located in a network-side server, or a distributed system located on the network side, e.g., a processing engine or distributed system in the developer tool on the network side. This is not particularly limited in this embodiment.

It may be understood that the application may be a native application (nativeAPP) installed on the local terminal, or a web program (webAPP) of a browser on the local terminal. This is not particularly limited in this embodiment.

In the present disclosure, the first compilation result of the hosted APP and the second compilation result of the hosted APP are both constructed by the developer tool according to the same source code of the hosted APP, and they are different from each other in that the first compilation result may be an original compilation result before the compilation optimization of the developer tool; the second compilation result may be an optimized compilation result after the compilation optimization of the developer tool.

Specifically, the first compilation result may be an original compilation result before the compilation optimization of the developer tool, and it may run on all versions above the lowest version of a hosted APP framework set by the developer; the second compilation result may be one or more optimized compilation results after the compilation optimization of the developer tool, for example, the latest compilation result after the latest compilation optimization, and intermediate compilation results after historical compilation optimization of the developer tool one time or more times. The second compilation result may run on versions above the lowest version of the hosted APP framework recorded by the developer tool.

The so-called original compilation result may refer to an initial version without a change of a constructed product involved by an original function without any optimization on the developer tool, for example, an S1 version without any optimization being activated; the so-called latest compilation result may refer to a changed version with changes of the constructed product involved by a function having undergone all optimizations on the developer tool, e.g., a S5 version for which 10 items of optimization have been activated; the so-called intermediate compilation result may refer to a changed version with one or more changes of the constructed product involved by a function having undergone partial optimizations on the developer tool, e.g., a S2 version for which 3 items of optimizations have been activated, a S3 version for which 5 items of optimizations have been activated, and a S4 version for which 8 items of optimizations have been activated.

As such, the first compilation result of the hosted APP before the compilation optimization, and a plurality of second compilation results after the compilation optimization being performed multiple times are constructed respectively based on the source code of the hosted APP through the developer tool, so that the developer tool not only can provide an optimized compilation result of a single version, but also further provide optimized compilation results of multiple versions, thereby improving the reliability in running the constructed product online after a change.

To simplify the operation, the second compilation result may preferably be the latest compilation result after the latest compilation optimization of the developer tool. As such, the developer tool may no longer internally maintain the intermediate result after the optimization of the constructed product, namely, the intermediate compilation result, thereby making the later distribution design simpler on the one hand, and making the processing of the developer tool and management tool simpler on the other hand.

In the present disclosure, the environment data of the hosted APP running environment provided by the host APP includes at least one of: version data of the host APP, e.g., a version number of a Baidu APP; or version data of the hosted APP running environment provided by the host APP.

The version data of the hosted APP running environment provided by the host APP may be the version data of a hosted APP running platform integrated by the host APP, e.g., a version number of a mini program runtime Software Development Kit (SDK), or may be version data of a hosted APP framework loaded on the hosted APP running platform integrated by the host APP, e.g., a version number of a Baidu Smart Mini program Core Framework (swanjs). This is not particularly limited in this embodiment.

Usually, the version data of the host APP may be correspond one to one with the version data of the hosted APP running environment provided by the host APP. Therefore, if one of them is determined, the other may be determined. Similarly, the version data of the hosted APP running platform integrated by the host APP may correspond one to one with the version data of the hosted APP framework loaded on the hosted APP running platform integrated by the host APP. Therefore, if one of them is determined, the other may be determined.

The so-called hosted APP running platform may be used to provide a running environment for the hosted APP in the host APP, and is a requisite condition by which the hosted APP can be activated and run in the host APP. The hosted APP running platform may provide the hosted APP with a template of an interface to be displayed, a browser and personalized service for different host APPs or different operation systems.

Optionally, in a possible implementation of the present application, at 203, specifically, a different transmission policy may be employed to upload the compilation result of the constructed hosted APP to the management platform.

In a specific implementation process, the developer tool needs to upload the compilation results of the hosted APP in an agreed specified order, e.g., upload the first compilation result first, and then upload the second compilation result.

Correspondingly, after the compilation results of the hosted APP uploaded by the developer tool in the agreed specified order are received, the management platform may, according to the uploading order of the developer tool, marking the hosted APP running environment on which the compilation results depend, namely, marking environment data such as the lowest version of the hosted APP running environment on which the compilation results depend, and the lowest version of the hosted APP framework uploaded on the hosted APP running platform on which the compilation results depend, to ensure the version data of the hosted APP running environment on which the second compilation result depends is greater than the version data of the hosted APP running environment on which the first compilation result depends, and the version data of the hosted APP running environment on which the second compilation result depends increments in an ascending order according to the number of optimized functions.

For example, the developer tool first uploads the first compilation result. After receiving the first compilation result, the management platform may record the lowest version of the hosted APP running environment on which the first compilation result depends, as the lowest version S1 of the hosted APP running environment set by the developer, and mark the first compilation result as V. Then, the developer tool uploads the second compilation result. If there are a plurality of compilation results, the compilation results may be uploaded sequentially in an ascending order according to the number of the optimized functions. After the second compilation result is received, take one second compilation result as an example, the management platform may record the lowest version of the hosted APP running environment on which the second compilation result depends as the lowest version of the hosted APP running environment recorded by the developer tool, for example, mark the lowest version of the Baidu Smart Mini program Core Framework (swanjs) as S2 (S1⇐S2), and mark the second compilation result as V1 (V<V1).

In another specific implementation process, after the compilation result of the hosted APP is constructed, the developer tool may specifically generate the version data of the compilation results according to the compilation results of the hosted APP. The version data of the compilation results may include but not limited the version data of the first compilation result, the lowest version data of the hosted APP running environment on which the first compilation result depends, the version data of the second compilation result, and the lowest version data of the hosted APP running environment on which the second compilation result depends. Then, the developer tool may upload the compilation results and respective version data of the compilation results to the management platform.

The lowest version data of the hosted APP running environment on which the compilation results (namely, the first compilation result and second compilation result) of the hosted APP depend may be the version data of the hosted APP running platform on which they depend, for example, a version number of a mini program runtime SDK, or may be the lowest version data of the hosted APP framework loaded on the hosted APP running platform on which they depend, e.g., a version number of a Baidu Smart Mini program Core Framework (swanjs). This is not particularly limited in this embodiment.

In the implementation process, the order in which the developer tool uploads the compilation results of the hosted APP may be a random order, and may not necessarily be the agreed specified order. The version data of the compilation results generated by the developer tool may be used to indicate a version mark of the hosted APP undergoing the compilation processing this time, for example, the developer tool may specifically sequentially generate the version data of the compilation results according to a current-time compilation version generating rule of the hosted APP, or may be used to indicate version marks of the hosted APP after all complication processing, for example, the developer tool may specifically sequentially generate the version data of the compilation results according to a uniform compilation version generating rule of the hosted APP.

Correspondingly, after the compilation results of the hosted APP uploaded by the developer tool and the respective version data of the compilation results are received, the management platform may, according to the version data of the compilation results, mark the hosted APP running environment on which the compilation results depend, namely, mark the lowest version of the hosted APP running environment on which the compilation results depend, e.g., environment data such as the lowest version of the hosted APP framework uploaded on the hosted APP running platform on which the compilation results depend.

Optionally, in a possible implementation of this embodiment, after 203, the management platform may obtain the compilation results of the hosted APP uploaded by the developer tool, and then examine the compilation results of the hosted APP. Then, the runnable environment may be marked for the compilation results with a "passed" examination result, according to the examination results of the compilation results.

To enable the host APP that can only provide the lowest version of hosted APP running environment to obtain the compilation results of the hosted APP, the management platform may use the examination result of the first compilation result to perform association adjustment for the examination result of the second compilation result obtained according to a configuration and examination policy, thereby effectively improving the efficiency and reliability in running the hosted APP after the optimization.

Specifically, the management platform may examine the first compilation result and second compilation result, respectively according to a conventional configuration and examination policy.

For example, the management platform generates a corresponding host version two-dimensional code according to the lowest version data of the hosted APP running environment on which the compilation results (namely, the first compilation result and the second compilation result) of the hosted APP depend, and then the host APP used by an examiner runs the compilation results according to the host version two-dimensional code so that the examiner examines the compilation results, e.g., whether the running function of the compilation results is normal, and whether there exist some behaviors against the design specification of the hosted APP.

After the first compilation result and the second compilation result is examined respectively to obtain the examination result of the first compilation result and the examination result of the second compilation result respectively, if the examination result of the first compilation result is "pass", the management platform may not adjust the examination result of the second compilation result; if the examination result of the first compilation result is "fail to pass", the management platform may adjust the examination result of the second compilation result as "failing to pass".

After the respective examination results of the compilation results are obtained, the management platform may mark the runnable environment for the compilation result that has passed the examination processing, according to the examination results of the compilation results and the lowest version of the hosted APP running environment on which the marked compilation results depend.

For example, the management platform marks a distribution section of the first compilation result of the hosted APP as [S1, positive infinite), i.e., the version number of the hosted APP running environment that the host APP may provide may be issued within a range of [S1, positive infinite), e.g., the version number of Baidu Smart Mini program Core Framework (swanjs) running in the host APP may be issued within the range of [S1, positive infinite).

Alternatively, as another example, the management platform marks the distribution section of the second compilation result of the hosted APP as [S2, positive infinite), S1⇐S2, i.e., the version number of the hosted APP running environment that the host APP may provide may be issued within a range of [S2, positive infinite), e.g., the version number of Baidu Smart Mini program Core Framework (swanjs) running in the host APP may be issued within the range of [S2, positive infinite).

So far, the management platform of the hosted APP may prepare to perform distribution of the compilation results of the hosted APP.

After receiving from the host APP the request to obtain the hosted APP, the management platform may obtain the environment data of the hosted APP running environment provided by the host APP, and then the management platform may, according to the environment data of the hosted APP running environment provided by the host APP, query in the compilation results of the host APP uploaded on the developer tool to obtain a compilation result runnable by the host APP. Then, the management platform may send the obtained compilation result runnable by the host APP to the host APP so that the host APP runs the compilation result using the hosted APP running environment provided by the host APP.

Specifically, the management platform may specifically perform first-time judgment processing for the environment data of the hosted APP running environment provided by the host APP, to judge whether the environment data of the hosted APP running environment provided by the host APP is within the distribution section of the second compilation result of the hosted APP.

If the environment data of the hosted APP running environment provided by the host APP is within the distribution section of the second compilation result of the hosted APP, the management platform may take the second compilation result of the hosted APP as a query processing result, namely, a compilation result runnable by the host APP.

If the environment data of the hosted APP running environment provided by the host APP is not within the distribution section of the second compilation result of the hosted APP, the management platform may further perform second-time judgment processing for the environment data of the hosted APP running environment provided by the host APP, to judge whether the environment data of the hosted APP running environment provided by the host APP is within the distribution section of the first compilation result of the hosted APP.

If the environment data of the hosted APP running environment provided by the host APP is within the distribution section of the first compilation result of the hosted APP, the management platform may take the first compilation result of the hosted APP as a query result, namely, a compilation result runnable by the host APP.

If the environment data of the hosted APP running environment provided by the host APP is not within the distribution section of the first compilation result of the hosted APP, the management platform may prompt the host APP to update the host APP.

So far, the management platform obtains a runnable compilation result matched with the host APP. The management platform issues the obtained host APP-runnable compilation result to the host APP, so that the host APP uses the hosted APP running environment provided by the host APP to run the compilation result.

After the technical solution of the present disclosure is applied, part of currently-determined optimization means get online through experiments to gain benefits. With the mechanism being made through, subsequent optimization means all may be put into operation through the passageway.

According to the technical solution of the present disclosure, mainly by solving the dependency 2 in the conventional production stage of the hosted APP, the developer tool, according to the hosted APP running environment provided by the host APP that might be currently used by a majority of users, constructs different constructed product versions for the source code of the developer's one hosted APP, namely, the original compilation result before the compilation optimization for the developer tool, and the optimized compilation result after the compilation optimization for the developer tool, thereby uploading the constructed product versions to the management platform of the hosted APP so that the management platform of the hosted APP purposefully issues the corresponding constructed product version according to the hosted APP running environment provided by the host APP used by the user. Since the dependency 1 and dependency 3 converge rapidly, for example, they both can converge to a 80%+ level within one week after the release of the new version, it can be ensured that the optimization means in the production stage of the hosted APP can get online within a short period of time, and cover many user traffic versions on the line after the technical solution of the present disclosure is applied.

In this embodiment, the developer tool constructs the first compilation result of the hosted APP before the compilation optimization and the second compilation result of the hosted APP after the compilation optimization respectively based on the source code of the hosted APP, and uploads them to the management platform. The management platform issues the corresponding compilation results according to the environment data of the hosted APP running environment provided by the host APP, so that the host APP uses the hosted APP running environment provided by the host APP to run the obtained compilation results. Since the compilation optimization of the hosted APP is no longer limited to the version of the host APP used by the user, the compilation optimization of the hosted APP is performed smoothly, thereby effectively improving the running efficiency and reliability of the hosted APP after the optimization.

In addition, according to the technical solution provided by the present disclosure, the developer tool not only constructs the second compilation result of the hosted APP after the compilation optimization, but also constructs the first compilation result of the hosted APP before the compilation optimization, so that the developer tool can get rid of the burden in keeping compatible with historical versions of the host APP during the compilation optimization such that the internal code of the developer tool is clearer, and its compilation products are more efficient, thereby improving the compilation efficiency of the developer tool.

In addition, the technical solution provided by the present disclosure can be employed to effectively open a new path for putting changes of the compilation products online quickly to gain large benefits.

In addition, the technical solution provided by the present disclosure can be employed to improve the user's experience.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to exemplary embodiments, and the involved actions and modules are not necessarily requisite for the present disclosure.

In the above embodiments, embodiments are respectively described with different emphasis being placed, and reference may be made to related depictions in other embodiments for portions not detailed in a certain embodiment.

Figure 3:
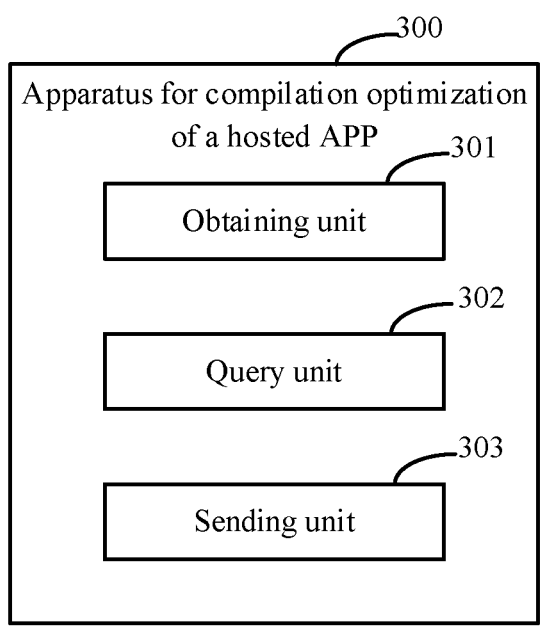
FIG. 3 illustrates a schematic diagram of a third embodiment of the present disclosure.

FIG. 3 illustrates a schematic diagram of a third embodiment of the present disclosure. As shown in FIG. 3, an apparatus 300 for compilation optimization of a hosted APP may include an obtaining unit 301, a query unit 302 and a sending unit 303. The obtaining unit is configured for obtaining environment data of a hosted APP running environment provided by a host APP in response to receiving from the host APP a request to obtain the hosted APP; the query unit 302 is configured for querying in compilation results of the hosted APP uploaded by a developer tool, according to the environment data of the hosted APP running environment provided by the host APP, to obtain a compilation result runnable by the host APP, herein the compilation results of the hosted APP include a first compilation result before compilation optimization and a second compilation result after the compilation optimization; the sending unit 303 is configured for sending to the host APP the compilation result runnable by the host APP obtained, so that the host APP runs the compilation result by using the hosted APP running environment provided by the host APP.

It is to be noted that apparatus for compilation optimization of the hosted APP according to this embodiment may partially or totally be a processing engine located in a network-side server, or a distributed system located on the network side, e.g., a processing engine or distributed system in a management platform on the network side. This is not particularly limited in this embodiment.

It may be understood that the host APP may be a native application (nativeAPP) installed on the local terminal, or a web program (webAPP) of a browser on the local terminal. This is not particularly limited in this embodiment.

Optionally, in a possible implementation of this embodiment, the second compilation result may be one compilation result, or two or more compilation results.

Optionally, in a possible implementation of this embodiment, the environment data of the hosted APP running environment provided by the host APP includes at least one of: version data of the host APP, e.g., a version number of a Baidu APP; or version data of the hosted APP running environment provided by the host APP.

Figure 4:
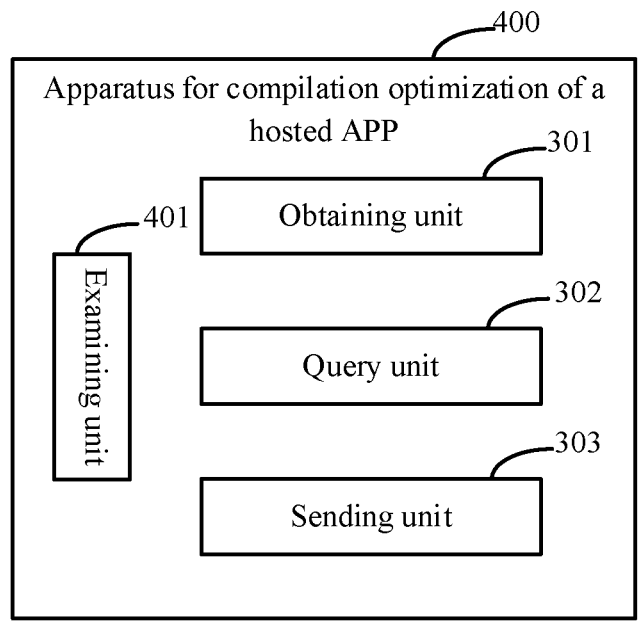
FIG. 4 illustrates a schematic diagram of a fourth embodiment of the present disclosure.

Optionally, in a possible implementation of this embodiment, as shown in FIG. 4, an apparatus 400 for compilation optimization of a hosted APP provided by this embodiment may further include an examining unit 401 configured for obtaining the compilation results of the hosted APP uploaded by the developer tool; examining each of the compilation results of the hosted APP; and marking a runnable environment for a compilation result whose examination result is "passed", according to the respective examination results of the compilation results.

Specifically, the examining unit 401 is specifically configured for examining the first compilation result and the second compilation result respectively, to obtain an examination result of the first compilation result and an examination result of the second compilation result, respectively; if the examination result of the first compilation result is "pass", not adjust the examination result of the second compilation result; and if the examination result of the first compilation result is "fail to pass", adjust the examination result of the second compilation result as "failing to pass".

It is to be noted that the method in the embodiment corresponding to FIG. 1 may be implemented by the apparatus for compilation optimization of the hosted APP provided by this embodiment. Reference may be made to relevant content in the embodiment corresponding to FIG. 1 for detailed depictions. Details will not be presented any more here.

In this embodiment, the developer tool constructs the first compilation result of the hosted APP before the compilation optimization and the second compilation result of the hosted APP after the compilation optimization respectively based on the source code of the hosted APP, and uploads them to the management platform. The query unit and the sending unit respectively query for and send a corresponding compilation result according to the environment data of the hosted APP running environment provided by the host APP, so that the host APP uses the hosted APP running environment provided by the host APP to run the obtained compilation result. Since the optimization of the compilation processing of the hosted APP is no longer limited to the version of the host APP used by the user, the compilation optimization of the hosted APP is performed smoothly, thereby effectively improving the running efficiency and reliability of the hosted APP after the optimization.

In addition, according to the technical solution provided by the present disclosure, the developer tool not only constructs the second compilation result of the hosted APP after the compilation optimization, but also constructs the first compilation result of the hosted APP before the compilation optimization, so that the developer tool can get rid of the burden in keeping compatible with historical versions of the host APP during the compilation optimization such that the internal code of the developer tool is clearer, and its compilation products are more efficient, thereby improving the compilation efficiency of the developer tool.

In addition, the technical solution provided by the present disclosure can be employed to effectively open a new path for putting changes of the compilation products online quickly to gain large benefits.

In addition, the technical solution provided by the present disclosure can be employed to improve the user's experience.

Figure 5:
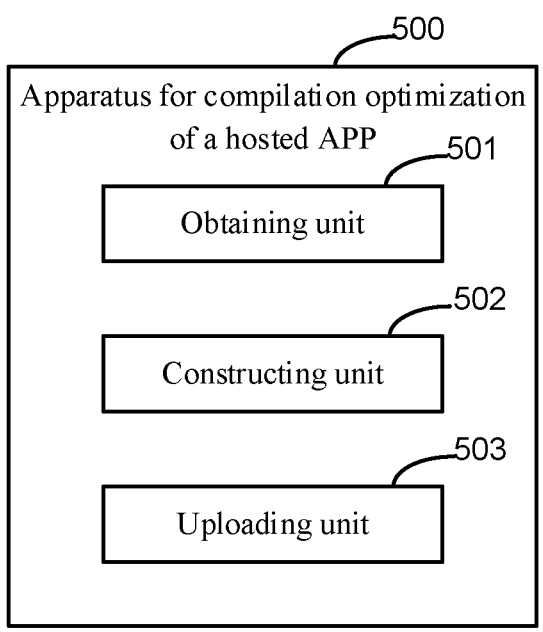
FIG. 5 illustrates a schematic diagram of a fifth embodiment of the present disclosure.

FIG. 5 illustrates a schematic diagram of a fifth embodiment of the present disclosure. As shown in FIG. 5, an apparatus 500 for compilation optimization of a hosted APP may include an obtaining unit 501, a constructing unit 502 and an uploading unit 503. The obtaining unit 501 is configured for obtaining source code of a hosted APP; the constructing unit 502 is configured for constructing compilation results of the hosted APP according to the source code of the hosted APP, herein, the compilation results of the hosted APP includes a first compilation result before compilation optimization and a second compilation result after the compilation optimization; the uploading unit 503 is configured for uploading the compilation results of the hosted APP to a management platform.

It is to be noted that the apparatus for compilation optimization of the hosted APP according to this embodiment may partially or totally be an application located at a local terminal, or be a function unit such as a plug-in or a Software Development Kit (SDK) in the application located at the local terminal, or a processing engine located in a network-side server, or a distributed system located on the network side, e.g., a processing engine or distributed system in the developer tool on the network side. This is not particularly limited in this embodiment.

It may be understood that the application may be a native application (nativeAPP) installed on the local terminal, or a web program (webAPP) of a browser on the local terminal. This is not particularly limited in this embodiment.

Optionally, in a possible implementation of this embodiment, the second compilation result may be one compilation result, or two or more compilation results.

Optionally, in a possible implementation of this embodiment, the environment data of the hosted APP running environment provided by the host APP includes at least one of:

version data of the host APP, e.g., a version number of a Baidu APP; or version data of the hosted APP running environment provided by the host APP.

Optionally, in a possible implementation of this embodiment, the uploading unit 503 is specifically configured for generating respective version data of the compilation results according to the compilation results of the hosted APP, and the respective version data of the compilation results includes version data of the first compilation result, the lowest version data of the hosted APP running environment on which the first compilation result depends, version data of the second compilation result, and the lowest version data of the hosted APP running environment on which the second compilation result depends; and for uploading the compilation results and respective version data of the compilation results to the management platform.

Specifically, the uploading unit 503 is specifically configured for sequentially generating the respective version data of the compilation results according to a uniform compilation version generating rule of the hosted APP; or sequentially generating the respective version data of the compilation results according to a current-time compilation version generating rule of the hosted APP.

It is to be noted that the method in the embodiment corresponding to FIG. 2 may be implemented by the apparatus for compilation optimization of the hosted APP provided by this embodiment. Reference may be made to relevant content in the embodiment corresponding to FIG. 2 for detailed depictions. Details will not be presented any more here.

In this embodiment, the constructing unit constructs the first compilation result of the hosted APP before the compilation optimization and the second compilation result of the hosted APP after the compilation optimization respectively based on the source code of the hosted APP obtained by the obtaining unit, and the uploading unit uploads them to the management platform. The management platform sends the corresponding compilation results according to the environment data of the hosted APP running environment provided by the host APP, so that the host APP uses the hosted APP running environment provided by the host APP to run the obtained compilation results. Since the compilation optimization of the hosted APP is no longer limited to the version of the host APP used by the user, the compilation optimization of the hosted APP is performed smoothly, thereby effectively improving the running efficiency and reliability of the hosted APP after the optimization.

In addition, according to the technical solution provided by the present disclosure, the developer tool not only constructs the second compilation result of the hosted APP after the compilation optimization, but also constructs the first compilation result of the hosted APP before the compilation optimization, so that the developer tool can get rid of the burden in keeping compatible with historical versions of the host APP during the compilation optimization such that the internal code of the developer tool is clearer, and its compilation products are more efficient, thereby improving the compilation efficiency of the developer tool.

In addition, the technical solution provided by the present disclosure can be employed to effectively open a new path for putting changes of the compilation products online quickly to gain large benefits.

In addition, the technical solution provided by the present disclosure can be employed to improve the user's experience.

According to embodiments of the present disclosure, the present disclosure further provides an electronic device and a non-transitory computer-readable storage medium in which computer instructions are stored.

Figure 6:
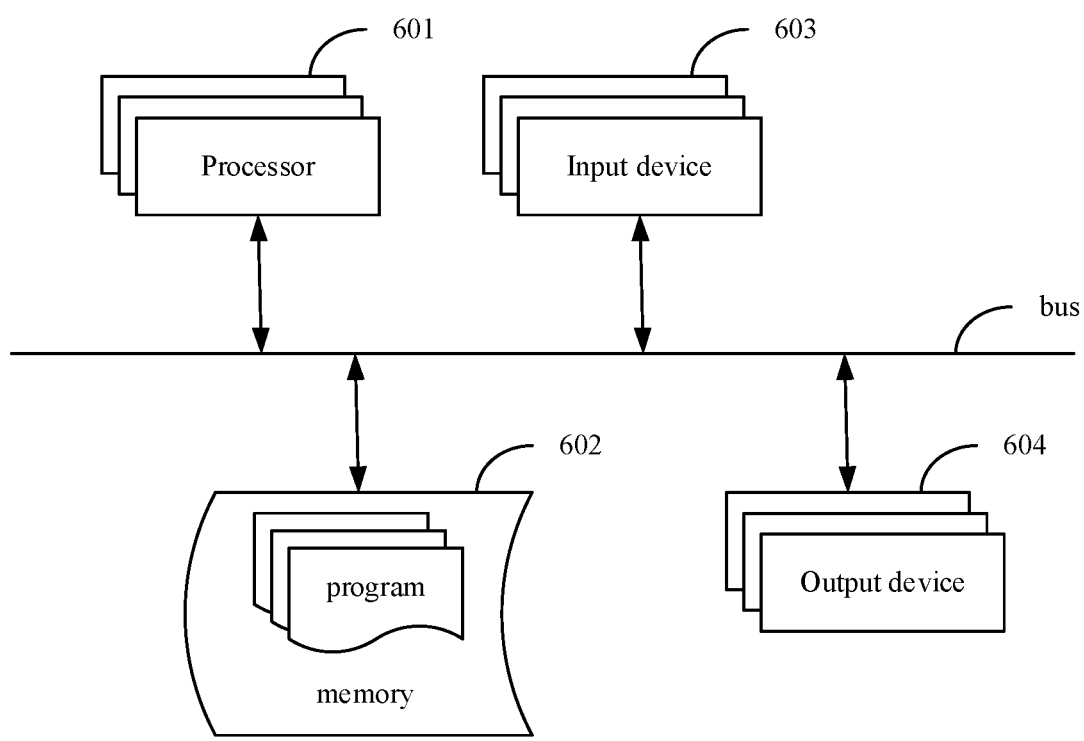
FIG. 6 illustrates a block diagram of an electronic device for implementing a method for compilation optimization of a hosted APP according to an embodiment of the present disclosure.

As shown in FIG. 6, it shows a block diagram of an electronic device for implementing the method for compilation optimization of the hosted APP according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the disclosure described and/or claimed in the text here.

As shown in FIG. 6, the electronic device includes: one or more processors 601, a memory 602, and interfaces configured to connect components and including a high-speed interface and a low speed interface. Each of the components are interconnected using various busses, and may be mounted on a common motherboard or in other manners as appropriate. The processor can process instructions for execution within the electronic device, including instructions stored in the memory or on the storage device to display graphical information for a GUI on an external input/output device, such as a display device coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor 601 is taken as an example in FIG. 6.

The memory 602 is a non-transitory computer-readable storage medium provided by the present disclosure. The memory stores instructions executable by at least one processor, so that the at least one processor executes the method for compilation optimization of the hosted APP according to the present disclosure. The non-transitory computer-readable storage medium of the present disclosure stores computer instructions, which are used to cause a computer to execute the method for compilation optimization of the hosted APP according to the present disclosure.

The memory 602 is a non-transitory computer-readable storage medium and can be used to store non-transitory software programs, non-transitory computer executable programs and modules, such as program instructions/units (e.g., the obtaining unit 301, the query unit 302 and the sending unit 303 shown in FIG. 3) corresponding to the method for compilation optimization of the hosted APP according to embodiments of the present disclosure. The processor 601 executes various functional applications and data processing of the server, i.e., implements the method for compilation optimization of the hosted APP according to embodiments of the present disclosure, by running the non-transitory software programs, instructions and units stored in the memory 602.

The memory 602 may include a storage program region and a storage data region, wherein the storage program region may store an operating system and an application program needed by at least one function; the storage data region may store data created by the use of the electronic device for implementing the method for compilation optimization of the hosted APP according to embodiments of the present disclosure. In addition, the memory 602 may include a high-speed random access memory, and may also include a non-transitory memory, such as at least one magnetic disk storage device, a flash memory device, or other non-transitory solid-state storage device. In some embodiments, the memory 602 may optionally include a memory remotely arranged relative to the processor 601, and these remote memories may be connected to the electronic device for implementing the method for compilation optimization of the hosted APP according to embodiments of the present disclosure. Examples of the above network include, but are not limited to, the Internet, an intranet, a local area network, a mobile communication network, and combinations thereof.

The electronic device for implementing the method for compilation optimization of the hosted APP may further include an input device 603 and an output device 604. The processor 601, the memory 602, the input device 603 and the output device 604 may be connected through a bus or in other manners. In FIG. 6, the connection through the bus is taken as an example.

The input device 603 may receive inputted numeric or character information and generate key signal inputs related to user settings and function control of the electronic device for implementing the method for compilation optimization of the hosted APP according to embodiments of the present disclosure, and may be an input device such as a touch screen, keypad, mouse, trackpad, touchpad, pointing stick, one or more mouse buttons, trackball and joystick. The output device 304 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other. The server may be a cloud server, also known as a cloud computing server or a cloud host, and is a host product in the cloud computing service system to solve defects in conventional physical hosts and VPS service such as large difficulty in management and undesirable service extension.

According to technical solutions of embodiments of this embodiment, the developer tool constructs the first compilation result of the hosted APP before the compilation optimization and the second compilation result of the hosted APP after the compilation optimization respectively based on the source code of the hosted APP, and uploads them to the management platform. The management platform sends the corresponding compilation results according to the environment data of the hosted APP running environment provided by the host APP, so that the host APP uses the hosted APP running environment provided by the host APP to run the obtained compilation results. Since the optimization of the compilation processing of the hosted APP is no longer limited to the version of the host APP used by the user, the optimization of the compilation processing of the hosted APP is performed smoothly, thereby effectively improving the running efficiency and reliability of the hosted APP after the optimization.

In addition, according to the technical solutions provided by the present disclosure, the developer tool not only constructs the second compilation result of the hosted APP after the compilation optimization, but also constructs the first compilation result of the hosted APP before the compilation optimization, so that the developer tool can get rid of the burden in keeping compatible with historical versions of the host APP during the compilation optimization such that the internal code of the developer tool is clearer, and its compilation products are more efficient, thereby improving the compilation efficiency of the developer tool.

In addition, the technical solution provided by the present disclosure can be employed to effectively open a new path for putting changes of the compilation products online quickly to gain large benefits.

In addition, the technical solution provided by the present disclosure can be employed to improve the user's experience.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A method implemented by a server for compilation optimization of a hosted application (APP), comprising:
    obtaining environment data of a hosted APP running environment provided by a host APP on a terminal, in response to receiving from the host APP a request to obtain the hosted APP, wherein the environment data of the hosted APP running environment provided by the host APP comprises at least one of: version data of the host APP; or version data of the hosted APP running environment provided by the host APP;

querying compilation results of the hosted APP and respective version data of the compilation results uploaded by a developer tool, according to the environment data of the hosted APP running environment provided by the host APP, to obtain a compilation result runnable by the host APP, wherein the compilation results of the hosted APP comprise a first compilation result before compilation optimization and a second compilation result after the compilation optimization, and wherein the respective version data of the compilation results include version data of the first compilation result, the lowest version data of the hosted APP running environment on which the first compilation result depends, version data of the second compilation result, and the lowest version data of the hosted APP running environment on which the second compilation result depends; and sending to the host APP the compilation result runnable by the host APP obtained, so that the host APP runs the compilation result by using the hosted APP running environment provided by the host APP.

2. The method according to claim 1, wherein the second compilation result comprises a plurality of compilation results.

3. The method according to claim 1, further comprising:
before querying in compilation results of the hosted APP uploaded by the developer tool, according to the environment data of the hosted APP running environment provided by the host APP, to obtain the compilation result runnable by the host APP,
obtaining the compilation results of the hosted APP uploaded by the developer tool;
examining each of the compilation results of the hosted APP; and
marking a runnable environment for a compilation result whose examination result is "pass", according to the examination results of the compilation results.

4. The method according to claim 3, wherein the examining each of the compilation results of the hosted APP comprises:
examining the first compilation result and the second compilation result respectively, to obtain an examination result of the first compilation result and an examination result of the second compilation result respectively;
if the examination result of the first compilation result is "pass", not adjusting the examination result of the second compilation result; and
if the examination result of the first compilation result is "fail to pass", adjusting the examination result of the second compilation result as "failing to pass".

5. A method implemented by a developer tool for compilation optimization of a hosted application (APP), comprising:
obtaining source code of a hosted APP;
constructing compilation results of the hosted APP according to the source code of the hosted APP, wherein the compilation results of the hosted APP comprise a first compilation result before compilation optimization and a second compilation result after the compilation optimization;
generating respective version data of the compilation results according to the compilation results of the hosted APP, wherein the respective version data of the compilation results include version data of the first compilation result, the lowest version data of the hosted APP running environment on which the first compilation result depends, version data of the second compilation result, and the lowest version data of the hosted APP running environment on which the second compilation result depends; and uploading the compilation results of the hosted APP and the respective version data of the compilation results to a management platform, so that one of the compilation results is selected to be sent to a host APP according to environment data of the hosted APP running environment provided by the host APP.

6. The method according to claim 5, wherein the second compilation result comprises a plurality of compilation results.

7. The method according to claim 5, wherein the generating respective version data of the compilation results according to the compilation results of the hosted APP comprises:
generating sequentially the respective version data of the compilation results according to a uniform compilation version generating rule of the hosted APP; or
generating sequentially the respective version data of the compilation results according to a current-time compilation version generating rule of the hosted APP.

8. The method according to claim 5, wherein the environment data of the hosted APP running environment provided by the host APP comprises at least one of:
version data of the host APP; or
version data of the hosted APP running environment provided by the host APP.

9. An electronic device serving as a server, comprising:
at least one processor; and
a memory communicatively connected with the at least one processor; wherein,
the memory stores instructions executable by the at least one processor, and the instructions are executed by the at least one processor to enable the at least one processor to carry out a method for compilation optimization of a hosted application (APP), which comprises:
obtaining environment data of a hosted APP running environment provided by a host APP on a terminal, in response to receiving from the host APP a request to obtain the hosted APP, wherein the environment data of the hosted APP running environment provided by the host APP comprises at least one of: version data of the host APP; or version data of the hosted APP running environment provided by the host APP;
querying compilation results of the hosted APP and respective version data of the compilation results uploaded by a developer tool, according to the environment data of the hosted APP running environment provided by the host APP, to obtain a compilation result runnable by the host APP, wherein the compilation results of the hosted APP comprise a first compilation result before compilation optimization and a second compilation result after the compilation optimization, and wherein the respective version data of the compilation results include version data of the first compilation result, the lowest version data of the hosted APP running environment on which the first compilation result depends, version data of the second compilation result, and the lowest version data of the hosted APP running environment on which the second compilation result depends; and
sending to the host APP the compilation result runnable by the host APP obtained, so that the host APP runs the compilation result by using the hosted APP running environment provided by the host APP.

10. The electronic device according to claim 9, wherein the method further comprises:
before querying in compilation results of the hosted APP uploaded by the developer tool, according to the environment data of the hosted APP running environment provided by the host APP, to obtain the compilation result runnable by the host APP,
obtaining the compilation results of the hosted APP uploaded by the developer tool;
examining each of the compilation results of the hosted APP; and
marking a runnable environment for a compilation result whose examination result is "pass", according to the examination results of the compilation results.

11. The electronic device according to claim 10, wherein the examining each of the compilation results of the hosted APP comprises:
examining the first compilation result and the second compilation result respectively, to obtain an examination result of the first compilation result and an examination result of the second compilation result respectively;
if the examination result of the first compilation result is "pass", not adjusting the examination result of the second compilation result; and
if the examination result of the first compilation result is "fail to pass", adjusting the examination result of the second compilation result as "failing to pass".

12. An electronic device serving as a developer tool, comprising:
at least one processor; and
a memory communicatively connected with the at least one processor; wherein,
the memory stores instructions executable by the at least one processor, and the instructions are executed by the at least one processor to enable the at least one processor to carry out a method for compilation optimization of a hosted application (APP), which comprises:
obtaining source code of a hosted APP;
constructing compilation results of the hosted APP according to the source code of the hosted APP, wherein the compilation results of the hosted APP comprise a first compilation result before compilation optimization and a second compilation result after the compilation optimization;
generating respective version data of the compilation results according to the compilation results of the hosted APP, wherein the respective version data of the compilation results include version data of the first compilation result, the lowest version data of the hosted APP running environment on which the first compilation result depends, version data of the second compilation result, and the lowest version data of the hosted APP running environment on which the second compilation result depends; and
uploading the compilation results of the hosted APP and the respective version data of the compilation results to a management platform, so that one of the compilation results is selected to be sent to a host APP according to environment data of the hosted APP running environment provided by the host APP.

13. The electronic device according to claim 12, wherein the generating respective version data of the compilation results according to the compilation results of the hosted APP comprises:
generating sequentially the respective version data of the compilation results according to a uniform compilation version generating rule of the hosted APP; or
generating sequentially the respective version data of the compilation results according to a current-time compilation version generating rule of the hosted APP.

14. The electronic device according to claim 12, wherein the environment data of the hosted APP running environment provided by the host APP comprises at least one of:
version data of the host APP; or
version data of the hosted APP running environment provided by the host APP.

15. A non-transitory computer-readable storage medium storing computer instructions, which, when executed by a computer serving as a server, cause the computer to carry out a method for compilation optimization of a hosted application (APP), which comprises:
obtaining environment data of a hosted APP running environment provided by a host APP on a terminal, in response to receiving from the host APP a request to obtain the hosted APP, wherein the environment data of the hosted APP running environment provided by the host APP comprises at least one of: version data of the host APP; or version data of the hosted APP running environment provided by the host APP;
querying compilation results of the hosted APP and respective version data of the compilation results uploaded by a developer tool, according to the environment data of the hosted APP running environment provided by the host APP, to obtain a compilation result runnable by the host APP, wherein the compilation results of the hosted APP comprise a first compilation result before compilation optimization and a second compilation result after the compilation optimization, and wherein the respective version data of the compilation results include version data of the first compilation result, the lowest version data of the hosted APP running environment on which the first compilation result depends, version data of the second compilation result, and the lowest version data of the hosted APP running environment on which the second compilation result depends; and
sending to the host APP the compilation result runnable by the host APP obtained, so that the host APP runs the compilation result by using the hosted APP running environment provided by the host APP.

16. A non-transitory computer-readable storage medium storing computer instructions, which, when executed by a computer serving as a developer tool, cause the computer to carry out a method for compilation optimization of a hosted application (APP), which comprises:
obtaining source code of a hosted APP;
constructing compilation results of the hosted APP according to the source code of the hosted APP, wherein the compilation results of the hosted APP comprise a first compilation result before compilation optimization and a second compilation result after the compilation optimization;
generating respective version data of the compilation results according to the compilation results of the hosted APP, wherein the respective version data of the compilation results include version data of the first compilation result, the lowest version data of the hosted APP running environment on which the first compilation result depends, version data of the second compilation result, and the lowest version data of the hosted APP running environment on which the second compilation result depends; and uploading the compilation results of the hosted APP and the respective version data of the compilation results to a management platform, so that one of the compilation results is selected to be sent to a host APP according to environment data of the hosted APP running environment provided by the host APP.

\* \* \* \* \*